(12) United States Patent
Suzuki et al.

(10) Patent No.: US 12,286,939 B2
(45) Date of Patent: Apr. 29, 2025

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Tomihisa Tsuchiya, Toyota (JP); Jun Miyagawa, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 18/454,944

(22) Filed: Aug. 24, 2023

(65) Prior Publication Data

US 2024/0110534 A1 Apr. 4, 2024

(30) Foreign Application Priority Data

Sep. 30, 2022 (JP) ................................. 2022-157859

(51) Int. Cl.
| | | |
|---|---|---|
| *F02D 19/02* | (2006.01) | |
| *F02D 41/00* | (2006.01) | |
| *F02D 41/38* | (2006.01) | |
| *F02M 21/02* | (2006.01) | |

(52) U.S. Cl.
CPC ......... *F02D 41/38* (2013.01); *F02D 41/0027* (2013.01); *F02D 2041/389* (2013.01)

(58) Field of Classification Search
CPC .......................... F02M 21/0275; F02M 19/028
See application file for complete search history.

(56) References Cited

U.S. PATENT DOCUMENTS

| | | | | |
|---|---|---|---|---|
| 3,982,693 | A * | 9/1976 | Hulsing | F02M 61/045 |
| | | | | 239/584 |
| 6,216,444 | B1 * | 4/2001 | Nagel | F02B 75/36 |
| | | | | 60/39.63 |
| 2014/0069387 | A1 * | 3/2014 | Brown | F02M 45/086 |
| | | | | 123/456 |
| 2014/0305101 | A1 * | 10/2014 | Katou | F02D 41/345 |
| | | | | 60/285 |
| 2017/0218897 | A1 * | 8/2017 | Kalenborn | F02M 45/086 |
| 2018/0066599 | A1 * | 3/2018 | Narahara | F02D 41/401 |
| 2018/0142629 | A1 * | 5/2018 | Stockner | F02D 35/023 |

FOREIGN PATENT DOCUMENTS

JP 2004-353460 A 12/2004

* cited by examiner

*Primary Examiner* — Long T Tran
(74) *Attorney, Agent, or Firm* — Oblon, McClelland, Maier & Neustadt, L.L.P.

(57) ABSTRACT

A controller is used for an internal combustion engine including a cylinder and a direct injection valve that injects gaseous fuel into the cylinder. A CPU of the controller executes acquisition of an in-cylinder pressure that is a pressure in the cylinder during one combustion cycle and a supply fuel pressure that is a pressure of the gaseous fuel supplied to the direct injection valve, and calculation of a backflow rate that is an amount of combustion gas flowing into the direct injection valve from the cylinder during one combustion cycle of the cylinder. In the calculation of the backflow rate, the CPU calculates the backflow rate such that the backflow rate becomes larger as the in-cylinder pressure increases and the backflow rate becomes larger as the supply fuel pressure decreases.

8 Claims, 6 Drawing Sheets

CONTROLLER AND CONTROL METHOD FOR INTERNAL COMBUSTION ENGINE

BACKGROUND

1. Field

The present disclosure relates to a controller and a control method for an internal combustion engine that are used for an internal combustion engine including a direct injection valve that injects gaseous fuel into a cylinder.

2. Description of Related Art

Japanese Laid-Open Patent Publication No. 2004-353460 discloses an internal combustion engine including a direct injection valve that injects compressed natural gas (CNG) into a cylinder.

Generally, in an internal combustion engine in which gaseous fuel such as CNG is injected into a cylinder from a direct injection valve, a supply fuel pressure that is a pressure of fuel supplied to the direct injection valve is set to a lower pressure than in a case in which liquid fuel such as gasoline is used. In addition, abnormal combustion such as pre-ignition occurs in the cylinder during the compression stroke, so that the pressure in the cylinder may become excessively high. In such a case, in an internal combustion engine using gaseous fuel such as CNG, it is difficult to maintain a state in which the direct injection valve is closed. As a result, the combustion gas in the cylinder may flow back into the direct injection valve. Since the combustion gas in the cylinder has a high temperature, when the backflow rate of the combustion gas into the direct injection valve is large, anomaly may occur in the direct injection valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine includes a cylinder and a direct injection valve that injects gaseous fuel into the cylinder. The controller is processing circuitry that controls an operation of the internal combustion engine. The processing circuitry is configured to acquire an in-cylinder pressure that is a pressure in the cylinder during one combustion cycle of the cylinder and a supply fuel pressure that is a pressure of the gaseous fuel supplied to the direct injection valve, calculate a backflow rate, which is an amount of combustion gas flowing into the direct injection valve from the cylinder during one combustion cycle of the cylinder; and, in the calculation of the backflow rate, calculate the backflow rate such that the backflow rate becomes larger as the in-cylinder pressure increases, and the backflow rate becomes larger as the supply fuel pressure decreases.

In another general aspect, a control method for an internal combustion engine is provided. The internal combustion engine includes a cylinder and a direct injection valve that injects gaseous fuel into the cylinder. The control method includes: acquiring an in-cylinder pressure that is a pressure in the cylinder during one combustion cycle of the cylinder and a supply fuel pressure that is a pressure of gaseous fuel supplied to the direct injection valve; and calculating a backflow rate that is an amount of combustion gas flowing into the direct injection valve from the cylinder during one combustion cycle of the cylinder, the backflow rate being calculated such that the backflow rate becomes larger as the in-cylinder pressure increases, and the backflow rate becomes larger as the supply fuel pressure decreases.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Hereinafter, a first embodiment of a controller for an internal combustion engine will be described with reference to FIGS. 1 to 5.

Figure 1:
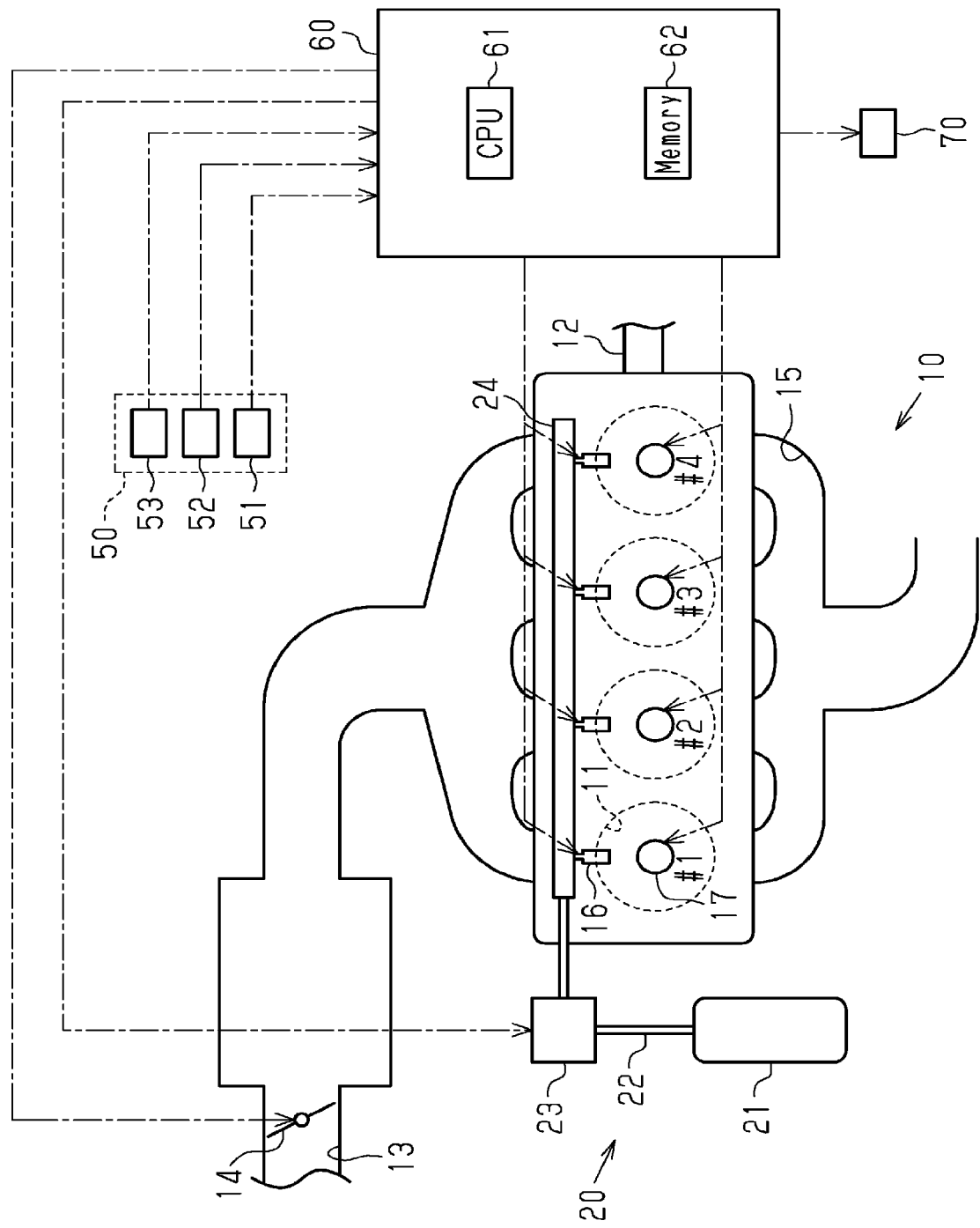
FIG. 1 is a schematic diagram illustrating a controller for an internal combustion engine according to a first embodiment and an internal combustion engine for which the controller is used.

FIG. 1 illustrates an internal combustion engine 10 mounted on a vehicle and a controller 60 used for the internal combustion engine 10. The controller 60 corresponds to a controller for an internal combustion engine.

Internal Combustion Engine

The internal combustion engine 10 is a hydrogen engine using hydrogen gas as fuel. Hydrogen gas corresponds to gaseous fuel. The internal combustion engine 10 includes cylinders 11, a crankshaft 12, an intake passage 13, a throttle valve 14, and an exhaust passage 15. In the present example illustrated in FIG. 1, the internal combustion engine 10 includes four cylinders 11. In the present specification, when the four cylinders are collectively described, they are referred to as the cylinders 11, and when they are distinguished, they are referred to as a cylinder #1, a cylinder #2, a cylinder #3, and a cylinder #4.

The intake passage 13 is a passage through which air drawn into the cylinders 11 flows. The throttle valve 14 is installed in the intake passage 13. The amount of intake air, which is the amount of air flowing through the intake passage 13, is adjusted by adjusting the throttle opening degree, which is the opening degree of the throttle valve 14.

The internal combustion engine 10 includes direct injection valves 16 and ignition devices 17. One direct injection valve 16 and one ignition device 17 are provided for each cylinder 11. The direct injection valve 16 injects fuel into the cylinder 11. The configuration of the direct injection valve 16 will be described later. In the cylinders 11, combustion gas containing air and fuel is combusted by electric discharge of the ignition device 17. Power obtained by combustion of the combustion gas is transmitted to the crankshaft 12, whereby the crankshaft 12 rotates. In the cylinders 11, exhaust gas is generated by combustion of the combustion gas. Such exhaust gas is discharged from the cylinders 11 to the exhaust passage 15.

The internal combustion engine 10 includes a fuel supply device 20 that supplies fuel to the direct injection valves 16. The fuel supply device 20 includes a fuel tank 21, a fuel supply passage 22, a pressure adjusting device 23, and a delivery pipe 24.

The fuel tank 21 stores high-pressure fuel. The fuel supply passage 22 is a passage for supplying the fuel stored in the fuel tank 21 to the delivery pipe 24. The pressure adjusting device 23 is installed in a middle portion of the fuel supply passage 22. The pressure adjusting device 23 is controlled by the controller 60 to reduce the pressure of the fuel flowing through the fuel supply passage 22. Therefore, the pressure of the fuel flowing through the portion of the fuel supply passage 22 between the pressure adjusting device 23 and the delivery pipe 24 is lower than the pressure of the fuel flowing through the portion of the fuel supply passage 22 between the pressure adjusting device 23 and the fuel tank 21.

Multiple direct injection valves 16 are connected to the delivery pipe 24. That is, the delivery pipe 24 temporarily stores the fuel to be supplied to the direct injection valves 16. The pressure of the fuel in the delivery pipe 24 corresponds to the supply fuel pressure, which is the pressure of the fuel supplied to the direct injection valves 16.

The configuration of the direct injection valve 16 will be described with reference to FIGS. 2A and 2B.

Figure 2A:
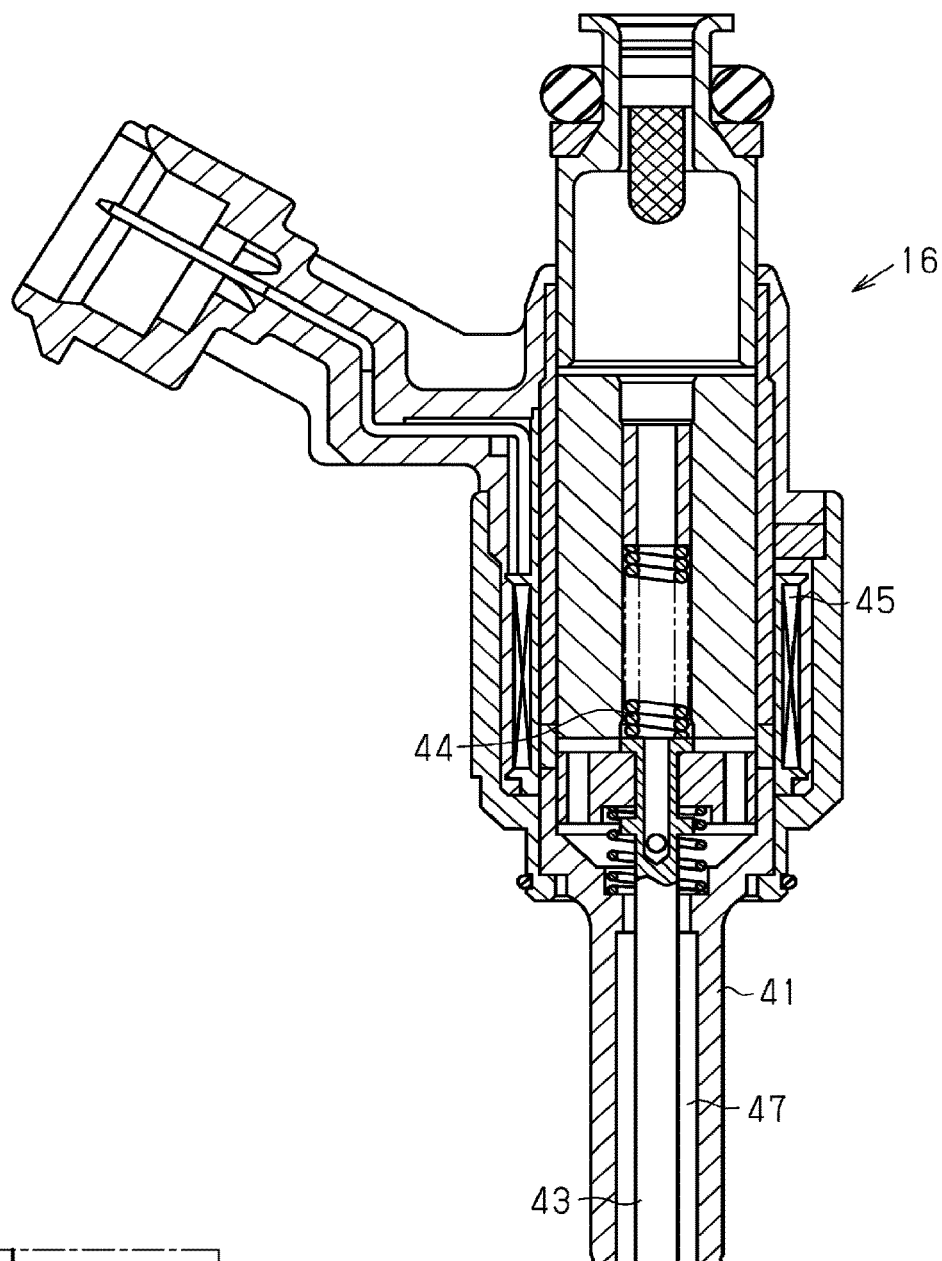
FIG. 2A is a cross-sectional view of a direct injection valve included in the internal combustion engine.
Figure 2B:
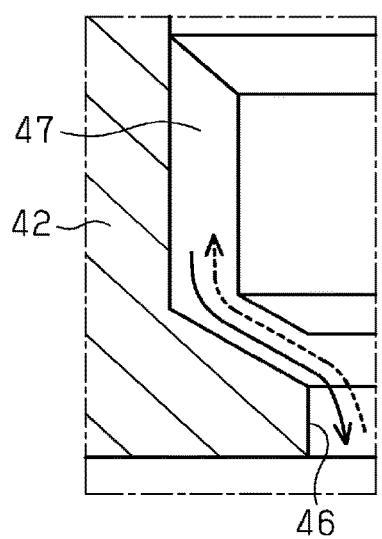
FIG. 2B is an enlarged diagram of a part of the direct injection valve.

As illustrated in FIGS. 2A and 2B, the direct injection valve 16 includes a body 41, a seat 42, a needle 43, a spring 44, and an electromagnetic coil 45. The body 41 has a tubular shape. The seat 42 is held at a distal end portion 411 of the body 41. An injection port 46 for injecting fuel into the cylinder 11 is formed in the seat 42.

The needle 43 is accommodated in the body 41 in a state of being movable in a direction approaching the seat 42 and a direction separating from the seat 42. When the needle 43 is seated on the valve seat of the seat 42, the injection port 46 is closed. The needle 43 corresponds to the valve member of the direct injection valve. The state of the direct injection valve 16 in which the injection port 46 is closed is referred to as a state in which the direct injection valve 16 is closed. On the other hand, when the needle 43 is separated from the valve seat of the seat 42 as illustrated in FIG. 2B, the injection port 46 is opened. The state of the direct injection valve 16 in which the injection port 46 is opened in this manner is referred to as a state in which the direct injection valve 16 is opened.

An internal fuel passage 47 through which fuel flows is formed between the inner peripheral surface of the body 41 and the needle 43. The internal fuel passage 47 is connected to the delivery pipe 24. When the direct injection valve 16 is opened, the internal fuel passage 47 is connected to the injection port 46. At this time, when the pressure of the internal fuel passage 47 is higher than the pressure in the cylinder 11, the fuel is injected from the injection port 46 into the cylinder 11 as indicated by a solid arrow in FIG. 2B.

The spring 44 urges the needle 43 in a direction in which the needle 43 is pressed against the seat 42. That is, when the direct injection valve 16 is closed, the force pressing the needle 43 against the seat 42 increases as the urging force of the spring 44 increases. When the electromagnetic coil 45 is energized, an electromagnetic force in a direction in which the needle 43 is separated from the seat 42 is generated. Then, the needle 43 is separated from the seat 42 against the force of the spring 44 pressing the needle 43 against the seat 42. As a result, the direct injection valve 16 is opened. On the other hand, when the energization of the electromagnetic coil 45 is stopped, the needle 43 is pressed against the seat 42 by the force of the spring 44. As a result, the direct injection valve 16 is closed.

A force of pressing the needle 43 against the seat 42 by the spring 44 when the direct injection valve 16 is closed is defined as a set load. The set load is set to such a magnitude that a state in which the needle 43 is seated on the valve seat of the seat 42 can be maintained when normal combustion is performed in the cylinder 11. That is, when the electromagnetic coil 45 is not energized, the state in which the needle 43 is seated on the valve seat of the seat 42 is maintained unless abnormal combustion such as pre-ignition occurs in the cylinder 11. In other words, when the pressure in the cylinder 11 becomes excessively high due to the occurrence of abnormal combustion as described above in the cylinder 11, the needle 43 may move in a direction away from the seat 42 against the supply fuel pressure to the direct injection valve 16 and the set load. In this case, since the needle 43 is separated from the seat 42, the injection port 46 is not closed.

Detection System of Internal Combustion Engine

As illustrated in FIG. 1, the internal combustion engine 10 includes a detection system 50 that detects a state of the internal combustion engine 10. The detection system 50 includes multiple sensors. The sensors output signals corresponding to detection results to the controller 60. The sensors include a crank angle sensor 51, in-cylinder pressure sensors 52a the number of which is the same as the number of cylinders, and a supply fuel-pressure sensor 53. One in-cylinder pressure sensor 52 is provided for each cylinder 11.

The crank angle sensor 51 detects a rotation angle of the crankshaft 12. The in-cylinder pressure sensor 52 detects the pressure in the corresponding cylinder 11. The supply fuel-pressure sensor 53 detects the supply fuel pressure in the delivery pipe 24. The rotation speed of the crankshaft 12 based on the detection value of the crank angle sensor 51 is referred to as an engine rotation speed NE. The pressure in the cylinder 11 based on the detection value of the in-cylinder pressure sensor 52 is referred to as an in-cylinder pressure detection value PCYS. The supply fuel pressure in the delivery pipe 24 based on the detection value of the supply fuel-pressure sensor 53 is referred to as a supply fuel pressure detection value PDS.

Controller

The controller 60 is processing circuitry including a CPU 61 and a memory 62. The memory 62 stores various control programs executed by the CPU 61. The CPU 61 executes the control program to control the opening degree of the throttle valve 14, the fuel injection amount of the direct injection valves 16, and the ignition timing of the ignition devices 17 based on signals from the sensors. In the controller 60, the CPU 61 corresponds to the execution device.

The vehicle includes a warning device 70. When any anomaly occurs in the internal combustion engine 10, the warning device 70 operates to notify the occupant of the vehicle that an abnormality has occurred in the internal combustion engine 10.

Figure 3:
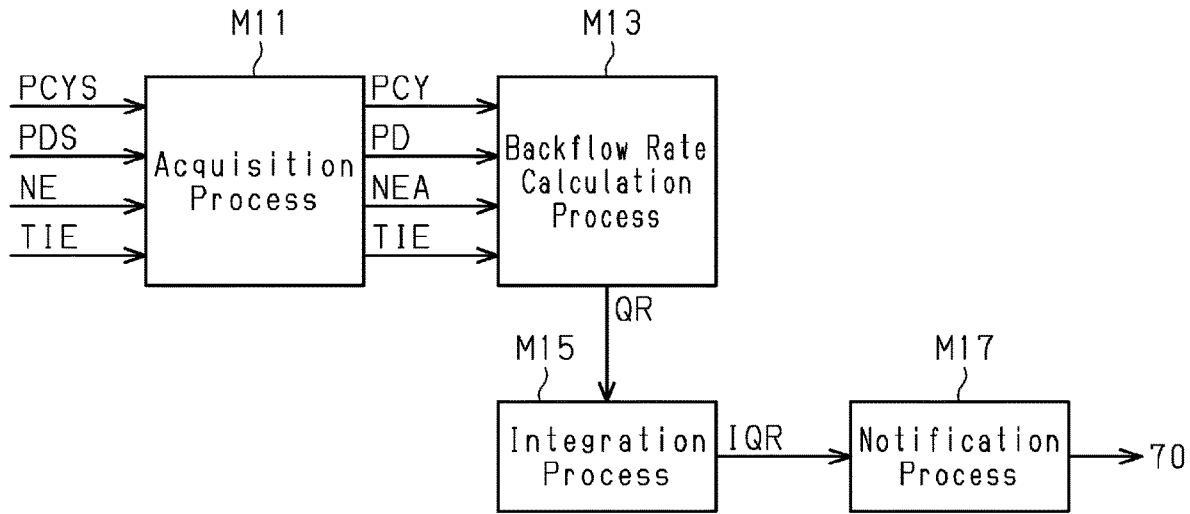
FIG. 3 is a block diagram illustrating processes executed by the controller according to the first embodiment.

As illustrated in FIG. 3, the CPU 61 executes the control program to execute an acquisition process M11, a backflow rate calculation process M13, an integration process M15, and a notification process M17.

Acquisition Process

In the acquisition process M11, the CPU 61 acquires information necessary in the backflow rate calculation process M13. Specifically, the CPU 61 acquires an in-cylinder pressure PCY, which is the pressure in the cylinder 11 during one combustion cycle of the cylinder 11, and a supply fuel pressure PD, which is the pressure of the fuel supplied from the delivery pipe 24 to the direct injection valve 16. Further, the CPU 61 acquires an engine rotation speed NEA. Also, the CPU 61 acquires an ending time TIE of the fuel injection of the direct injection valve 16.

The CPU 61 acquires the in-cylinder pressure PCY(N) of the cylinder #N during one combustion cycle of the cylinder #N. N is a cylinder number, and the cylinder number N is any one of 1, 2, 3, and 4. That is, the CPU 61 acquires the in-cylinder pressure PCY(1) of the cylinder #1 during one combustion cycle of the cylinder #1.The CPU 61 acquires the in-cylinder pressure PCY(2) of the cylinder #2 during one combustion cycle of the cylinder #2.The CPU 61 acquires the in-cylinder pressure PCY(3) of the cylinder #3 during one combustion cycle of the cylinder #3.The CPU 61 acquires the in-cylinder pressure PCY(4) of the cylinder #4 during one combustion cycle of the cylinder #4.

Specifically, the CPU 61 acquires the in-cylinder pressure PCY(N) during one combustion cycle of the cylinder #N based on the in-cylinder pressure detection values PCYS detected during one combustion cycle of the cylinder #N. For example, the CPU 61 acquires the maximum value among the in-cylinder pressure detection values PCYS detected during one combustion cycle of the cylinder #N as the in-cylinder pressure PCY(N) during one combustion cycle of the cylinder #N.

The CPU 61 acquires the supply fuel pressure PD(N) during one combustion cycle of the cylinder #N. That is, the CPU 61 acquires the supply fuel pressure PD(1) during one combustion cycle of the cylinder #1. The CPU 61 acquires the supply fuel pressure PD(2) during one combustion cycle of the cylinder #2. The CPU 61 acquires the supply fuel pressure PD(3) during one combustion cycle of the cylinder #3. The CPU 61 acquires the supply fuel pressure PD(4) during one combustion cycle of the cylinder #4.

Specifically, the CPU 61 acquires the supply fuel pressure PD(N) during one combustion cycle of the cylinder #N based on the supply fuel pressure detection values PDS detected during one combustion cycle of the cylinder #N. For example, the CPU 61 acquires an average value of the supply fuel pressure detection values PDS detected during one combustion cycle of the cylinder #N as the supply fuel pressure PD(N) during one combustion cycle of the cylinder #N.

The CPU 61 acquires the engine rotation speed NEA(N) during one combustion cycle of the cylinder #N. That is, the CPU 61 acquires the engine rotation speed NEA(1) during one combustion cycle of the cylinder #1. The CPU 61 acquires the engine rotation speed NEA(2) during one combustion cycle of the cylinder #2. The CPU 61 acquires the engine rotation speed NEA(3) during one combustion cycle of the cylinder #3. The CPU 61 acquires the engine rotation speed NEA(4) during one combustion cycle of the cylinder #4.

Specifically, the CPU 61 acquires the engine rotation speed NEA(N) during one combustion cycle of the cylinder #N based on the engine rotation speeds NE detected during one combustion cycle of the cylinder #N. For example, the CPU 61 acquires an average value of the engine rotation speeds NE detected during one combustion cycle of the cylinder #N as the engine rotation speed NEA(N) during one combustion cycle of the cylinder #N.

The CPU 61 acquires the ending time of the energization of the electromagnetic coil 45 of the direct injection valve 16 as the ending time TIE(N) of the fuel injection of the direct injection valve 16 for the cylinder #N. That is, the CPU 61 acquires the ending time TIE(1) of the fuel injection of the direct injection valve 16 for the cylinder #1. The CPU 61 acquires the ending time TIE(2) of the fuel injection of the direct injection valve 16 for the cylinder #2. The CPU 61 acquires the ending time TIE(3) of the fuel injection of the direct injection valve 16 for the cylinder #3. The CPU 61 acquires the ending time TIE(4) of the fuel injection of the direct injection valve 16 for the cylinder #4.

Backflow Rate Calculation Process

In the backflow rate calculation process M13, the CPU 61 calculates a backflow rate QR(N), which is the amount of combustion gas flowing into the direct injection valve 16 from the inside of the cylinder #N during one combustion cycle of the cylinder #N. That is, the CPU 61 calculates the backflow rate QR(1) in one combustion cycle of the cylinder #1. The CPU 61 acquires the backflow rate QR(2) during one combustion cycle of the cylinder #2. The CPU 61 acquires the backflow rate QR(3) during one combustion cycle of the cylinder #3. The CPU 61 acquires the backflow rate QR(4) in one combustion cycle of the cylinder #4.

The CPU 61 injects fuel from the direct injection valve 16 for the cylinder #N during the compression stroke of the cylinder #N. The fuel density of hydrogen gas injected as fuel by the direct injection valve 16 is lower than the fuel density of liquid fuel such as gasoline. Therefore, in the internal combustion engine 10 using hydrogen gas as fuel, generally, the ending time of the fuel injection of the direct injection valve 16 tends to be delayed as compared with the case of an internal combustion engine using liquid fuel as fuel.

When the pressure in the cylinder #N becomes excessively high due to the occurrence of abnormal combustion such as pre-ignition in the cylinder #N, the pressure in the cylinder #N may become higher than the pressure in the direct injection valve 16. Pre-ignition is likely to occur during the compression stroke of cylinder #N. If the direct injection valve 16 is energized when such abnormal combustion occurs, the combustion gas in cylinder #N may flow into the direct injection valve 16 via the injection port 46 as indicated by the arrow of a broken line in FIG. 2B. When abnormal combustion occurs, even if the energization of the direct injection valve 16 has already ended, if the pressure in the cylinder #N is larger than the sum of the supply fuel pressure to the direct injection valve 16 and the set load, the needle 43 may be separated from the valve seat of the seat 42 by the pressure in the cylinder #N. When the direct injection valve 16 cannot maintain the closed state as described above, the combustion gas in the cylinder #N may flow into the direct injection valve 16 via the injection port 46 as indicated by the arrow of a broken line in FIG. 2B.

When the direct injection valve 16 is not closed due to the abnormal combustion as described above, the magnitude of the differential pressure between the inside of the cylinder #N and the inside of the direct injection valve 16 increases as the pressure in the cylinder #N increases. Therefore, the amount of combustion gas flowing into the direct injection valve 16 from the inside of the cylinder #N increases. As the supply fuel pressure supplied to the direct injection valve 16 decreases, the magnitude of the differential pressure between the inside of cylinder #N and the inside of the direct injection valve 16 increases. Also in this case, the amount of combustion gas flowing into the direct injection valve 16 from the inside of the cylinder #N increases. In addition, as the engine rotation speed decreases, the duration of the state in which the direct injection valve 16 is not closed tends to be longer due to the excessively high pressure in the cylinder #N. In this case, the longer the duration, the larger the amount of combustion gas flowing into the direct injection valve 16 from the inside of the cylinder #N becomes. As the ending time of the fuel injection of the direct injection valve 16 retarded, the period during which the combustion gas flows from the inside of the cylinder #N into the direct injection valve 16 becomes longer. Also in this case, as the inflow period is extended, the amount of combustion gas flowing into the direct injection valve 16 from the inside of the cylinder #N increases.

Therefore, in the backflow rate calculation process M13, the CPU 61 calculates the backflow rate QR(N) such that the higher the in-cylinder pressure PCY(N) during one combustion cycle of the cylinder #N, the larger the backflow rate becomes. The CPU 61 calculates the backflow rate QR(N) such that the lower the supply fuel pressure PD(N) during one combustion cycle of the cylinder #N, the higher the backflow rate becomes. The CPU 61 calculates the backflow rate QR(N) such that the backflow rate increases as the engine rotation speed NEA(N) during one combustion cycle of the cylinder #N decreases. The CPU 61 calculates the backflow rate QR(N) such that the backflow rate increases as the ending time TIE(N) of the fuel injection of the direct injection valve 16 for the cylinder #N is later.

For example, the CPU 61 calculates the backflow rate QR using the following relational expression (D1). In the relational expression (D1), F1, F2, F3, and F4 are coefficients set based on the shape of the cylinder 11, the characteristics of the direct injection valve 16, and the like. For example, the coefficients F1, F2, F3, and F4 are set such that the backflow rate QR decreases as the design value of the set load of the direct injection valve 16 increases.

$$QR = F1 \times PCY - F2 \times PD - F3 \times NEA - F4 \times TIE \quad (D1)$$

Figure 4:
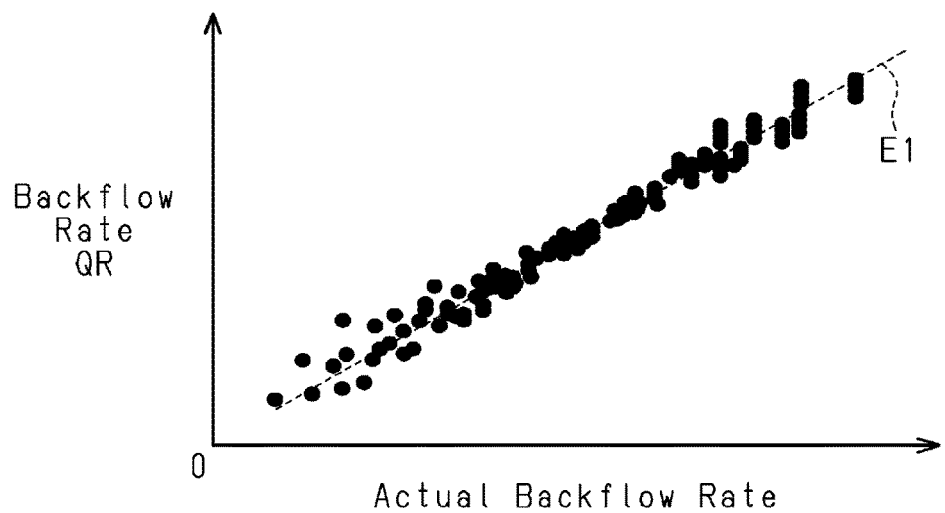
FIG. 4 is a graph illustrating a relationship between an actual backflow rate, which is an actual value of the amount of combustion gas flowing into the direct injection valve from the cylinder, and a backflow rate calculated by the controller of the first embodiment.

FIG. 4 is a graph illustrating a relationship between an actual backflow rate that is an actual backflow rate and a backflow rate QR that is a calculated value calculated using the relational expression (D1). The coefficients F1, F2, F3, and F4 are set such that the approximate expression E1 indicating the relationship between the actual backflow rate and the backflow rate QR is a linear function as indicated by a broken line in FIG. 4.

When calculating the backflow rate QR(N), which is the amount of combustion gas flowing into the direct injection valve 16 for the cylinder #N during one combustion cycle, the CPU 61 substitutes the in-cylinder pressure PCY(N), the supply fuel pressure PD(N), the engine rotation speed NEA(N), and the ending time TIE of fuel injection into the above relational expression (D1). Accordingly, the CPU 61 can calculate the backflow rate QR(N).

When abnormal combustion such as pre-ignition does not occur during one combustion cycle of the cylinder #N, the pressure in the cylinder #N does not become excessively high. Therefore, when the energization of the direct injection valve 16 is finished, the state in which the direct injection valve 16 is closed is maintained. That is, the combustion gas in the cylinder #N does not flow into the direct injection valve 16 during one combustion cycle of the cylinder #N. Therefore, the CPU 61 determines whether abnormal combustion such as pre-ignition has occurred in the cylinder #N for each combustion cycle. For example, the CPU 61 can determine whether abnormal combustion has occurred based on the transition of the in-cylinder pressure detection value PCYS in one combustion cycle of the cylinder #N. When it is determined that abnormal combustion has occurred, the CPU 61 executes the backflow rate calculation process M13 to calculate the backflow rate QR(N). On the other hand, when it is determined that no abnormal combustion has occurred, the CPU 61 does not execute the backflow rate calculation process M13 and thus does not calculate the backflow rate QR(N).

Integration Process

As illustrated in FIG. 3, in the integration process M15, the CPU 61 integrates the backflow rate QR calculated in the backflow rate calculation process M13 for each cylinder 11. That is, the CPU 61 integrates the backflow rate QR(1) into the direct injection valve 16 for the cylinder #1 to calculate the backflow rate integrated value IQR(1). The CPU 61 integrates the backflow rate QR(2) into the direct injection valve 16 for the cylinder #2 to calculate the backflow rate integrated value IQR(2). The CPU 61 integrates the backflow rate QR(3) into the direct injection valve 16 for the cylinder #3 to calculate a backflow rate integrated value IQR(3). The CPU 61 integrates the backflow rate QR(4) into the direct injection valve 16 for the cylinder #4 to calculate a backflow rate integrated value IQR(4).

Notification Process

In the notification process M17, when the backflow rate integrated value IQR(N) calculated in the integration process M15 is greater than or equal to a determination value IQRth, the CPU 61 notifies the occupant of the vehicle. Specifically, when any one of the backflow rate integrated values IQR(1), IQR(2), IQR(3), and IQR(4) is greater than or equal to the determination value IQRth, the CPU 61 notifies the occupant through the vehicle on-board warning device 70.

As described above, the combustion gas in the cylinder 11 has a very high temperature. On the other hand, the temperature of the fuel injected from the direct injection valve 16 into the cylinder 11 is very low as compared with the combustion gas. Therefore, when the combustion gas in the cylinder 11 repeatedly flows into the direct injection valve 16, heating of the component of the direct injection valve 16 by the combustion gas and cooling of the component by the fuel are repeated. When the heating and cooling of the components are repeated in this manner, anomaly may occur in the direct injection valve 16. For example, the thin film on the surface of the needle 43, which is one of the components of the direct injection valve 16, may be peeled off from the needle 43.

Therefore, in the controller 60, a value for determining whether there is a possibility that the anomaly as described above has occurred in the component of the direct injection valve 16 based on the backflow rate integrated value IQR(N) is used as the determination value IQRth.

Figure 5:
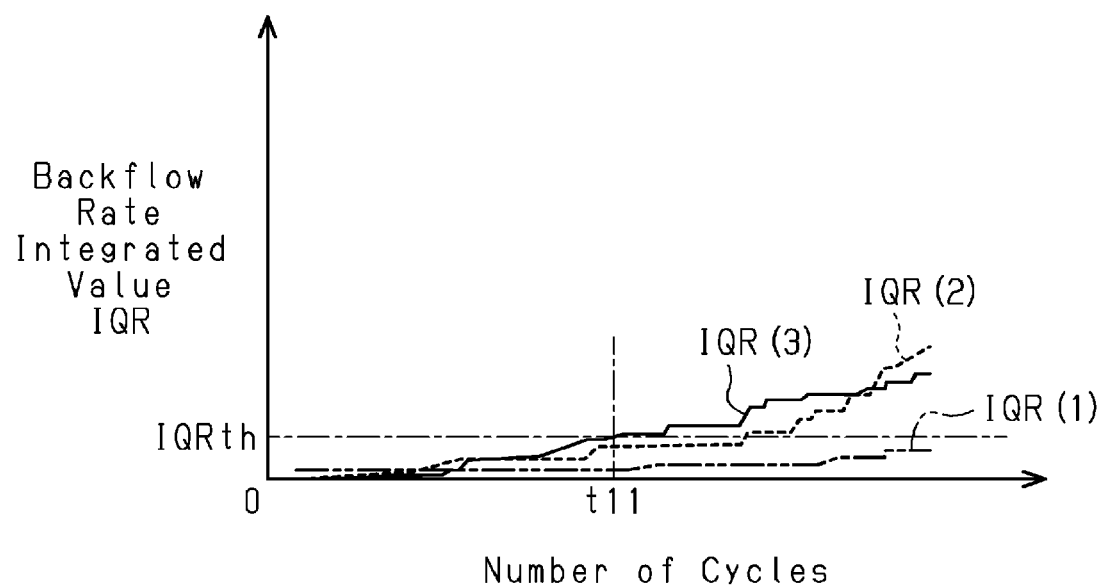
FIG. 5 is a diagram illustrating a transition of a backflow rate integrated value calculated by the controller of the first embodiment.

FIG. 5 illustrates a transition of multiple backflow rate integrated values IQR. In FIG. 5, for convenience of explanation and understanding, only transitions of three backflow rate integrated values IQR(1), IQR(2), and IQR(3) are illustrated. In the example illustrated in FIG. 5, among the multiple backflow rate integrated values IQR, the backflow rate integrated values IQR(2) and IQR(3) gradually increase, whereas the other backflow rate integrated values IQR(1) do not increase much. Since the backflow rate integrated value IQR(3) becomes greater than or equal to the determination value IQRth at point in time t11, the CPU 61 notifies the occupant through the warning device 70 that there is a possibility that an anomaly has occurred in the direct injection valve 16.

Operation and Advantages of First Embodiment (1-1) As described above, when abnormal combustion such as pre-ignition occurs in the cylinder #N during one combustion cycle of the cylinder #N, the pressure in the cylinder #N becomes excessively high. Therefore, the combustion gas in the cylinder #N may flow into the direct injection valve 16 for the cylinder #N. In this case, the amount of combustion gas flowing into the direct injection valve 16 from the cylinder #N tends to increase as the in-cylinder pressure PCY during one combustion cycle of the cylinder #N increases. As the supply fuel pressure PD(N) supplied to the direct injection valve 16 is lower, the amount of combustion gas flowing into the direct injection valve 16 from the cylinder #N tends to increase.

Therefore, the controller 60 calculates the backflow rate QR(N) such that the backflow rate increases as the in-cylinder pressure PCY(N) increases and the backflow rate increases as the supply fuel pressure PD(N) decreases. As a result, when abnormal combustion occurs in the cylinder #N and the pressure in the cylinder #N becomes excessively high, the amount of combustion gas flowing into the direct injection valve 16 from the cylinder #N during one combustion cycle is accurately calculated.

(1-2) As the maximum value of the pressure in the cylinder #N during one combustion cycle of the cylinder #N increases, the magnitude of the differential pressure between the inside of the cylinder #N and the inside of the direct injection valve 16 tends to increase. Therefore, the controller 60 acquires the maximum value of the pressure in the cylinder #N in one combustion cycle as the in-cylinder pressure PCY(N). Since the controller 60 calculates the backflow rate QR(N) based on the in-cylinder pressure PCY(N), the calculation accuracy of the backflow rate QR(N) is enhanced.

(1-3) When the combustion gas flows into the direct injection valve 16 from the inside of the cylinder #N, the amount of combustion gas flowing into the direct injection valve 16 from the inside of the cylinder #N tends to increase as the engine rotation speed NEA(N) decreases. Therefore, the controller 60 calculates the backflow rate QR(N) such that the backflow rate increases as the engine rotation speed NEA(N) decreases. In this manner, by calculating the backflow rate QR(N) in consideration of the engine rotation speed NEA(N), the calculation accuracy of the backflow rate QR(N) is further enhanced.

(1-4) When the combustion gas flows into the direct injection valve 16 from the inside of the cylinder #N, as the ending time TIE of the fuel injection of the direct injection valve 16 is retarded, the amount of combustion gas flowing into the direct injection valve 16 from the inside of the cylinder #N tends to increase. Therefore, the controller 60 calculates the backflow rate QR(N) such that the backflow rate increases as the ending time TIE is later. By calculating the backflow rate QR(N) in consideration of the ending time TIE in this manner, the calculation accuracy of the backflow rate QR(N) is further enhanced.

(1-5) The backflow rate QR(N) is used as an index indicating the degree of accumulation of damage suffered by the direct injection valve 16 due to the combustion gas in the cylinder #N flowing into the direct injection valve 16 during one combustion cycle of the cylinder #N. The controller 60 calculates a backflow rate integrated value IQR(N) obtained by integrating the backflow rate QR(N). When the backflow rate integrated value IQR(N) is greater than or equal to the determination value IQRth, there is a possibility that an anomaly has occurred in the components of the direct injection valve 16 for the cylinder #N. Therefore, when the backflow rate integrated value IQR(N) becomes greater than or equal to the determination value IQRth, the controller 60 notifies the occupant that there is a possibility that an anomaly has occurred in the internal combustion engine 10. As a result, it is possible to notify the occupant that it is time for maintenance of the internal combustion engine 10.

Second Embodiment

Figure 6:
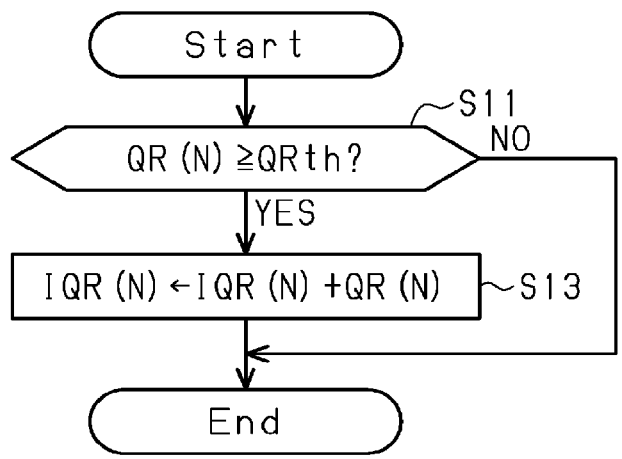
FIG. 6 is a flowchart illustrating an integration process executed by a controller for an internal combustion engine according to a second embodiment.

A controller for an internal combustion engine according to a second embodiment will be described with reference to FIG. 6. The second embodiment is different from the first embodiment in a part of processing contents of integration process. In the following description, parts different from those of the first embodiment will be mainly described, and the same component configurations as those of the first embodiment will be denoted by the same reference numerals, and redundant description will be omitted.

Integration Process

The integration process M15 executed by the CPU 61 of the controller 60 according to the present embodiment will be described with reference to FIG. 6.

In step S11, the CPU 61 determines whether the backflow rate QR(N) calculated in the backflow rate calculation process M13 is greater than or equal to a threshold QRth.

As described above, when the inflow of the combustion gas into the direct injection valve 16 is repeated, the component of the direct injection valve 16 is repeatedly heated and cooled, and damage is accumulated in the component.

The inventor of the present application has further obtained the following knowledge as a result of performing various experiments and simulations.

When the inflow amount of combustion gas from the inside of the cylinder #N into the direct injection valve 16 is small, the amount of thermal energy transferred from the combustion gas flowing into the direct injection valve 16 to the component is small, so that the increase amount of the temperature of the component is small. Therefore, even if a small amount of inflow of the combustion gas into the direct injection valve 16 is repeated, the component is hardly damaged because the vertical movement width of the temperature of the component is not so large.

Therefore, the threshold QRth is used as a criterion for determining whether the inflow amount of combustion gas from the inside of the cylinder #N into the direct injection valve 16 is small. When the backflow rate QR(N) is less than the threshold QRth, it is considered that the components of the direct injection valve 16 are not damaged due to the inflow of the combustion gas into the direct injection valve 16. On the other hand, when the backflow rate QR(N) is greater than or equal to the threshold QRth, it is considered that the components of the direct injection valve 16 receive the damage caused by the inflow of the combustion gas into the direct injection valve 16.

In step S11, when the backflow rate QR(N) is greater than or equal to the threshold QRth(YES), the CPU 61 advances the process to step S13. On the other hand, when the backflow rate QR(N) is less than the threshold QRth (S11: NO), the CPU 61 temporarily ends the integration process M15. That is, the CPU 61 does not integrate the backflow rate QR(N) less than the threshold QRth.

In step S13, the CPU 61 calculates the sum of the backflow rate integrated value IQR(N) and the backflow rate QR(N) as the latest value of the backflow rate integrated value IQR(N). That is, the CPU 61 calculates the backflow rate integrated value IQR(N) by integrating only the backflow rate QR(N) greater than or equal to the threshold QRth among the multiple backflow rates QR(N) calculated in the backflow rate calculation process M13. Thereafter, the CPU 61 temporarily ends the integration process M15.

Operation and Advantages of Second Embodiment

In the second embodiment, in addition to the same advantages as the advantages (1-1) to (1-5) of the first embodiment, the following advantages are further obtained.

(2-1) Even if the combustion gas flows into the direct injection valve 16, the components of the direct injection valve 16 are hardly damaged when the amount of combustion gas is small. Therefore, the controller 60 calculates the backflow rate integrated value IQR(N) by integrating only the backflow rate QR(N) greater than or equal to the threshold QRth. As a result, the degree of accumulation of damage to the components of the direct injection valve 16 and the backflow rate integrated value IQR(N) are highly correlated. Therefore, the controller 60 can notify the occupant that there is a possibility that an anomaly has occurred in the internal combustion engine 10 at a more appropriate timing.

Third Embodiment

A controller for an internal combustion engine according to a third embodiment will be described with reference to FIGS. 7 and 8. The third embodiment is different from the embodiments described above in a method of estimating the degree of accumulation of damage of the components of the direct injection valve. In the following description, parts different from the above-described embodiments will be mainly described, and the same component configurations as those of the above-described embodiments will be denoted by the same reference numerals, and redundant description will be omitted.

When the combustion gas flows into the direct injection valve 16 for the cylinder 11, thermal energy is transferred from the high-temperature combustion gas to the components of the direct injection valve 16. The larger the amount of combustion gas flowing from the cylinder 11 into the direct injection valve 16, the larger the amount of thermal energy transferred to the components becomes. The greater the amount of thermal energy transferred to the component, the greater the amount of temperature rise of the component becomes. In addition, as the internal temperature of the cylinder 11 increases, the temperature of the combustion gas tends to be higher. As the temperature of the combustion gas flowing into the direct injection valve 16 from the inside of the cylinder 11 increases, the amount of increase in the temperature of the components increases.

On the other hand, when the direct injection valve 16 is opened to cause the direct injection valve 16 to inject fuel into the cylinder 11, the fuel flowing in the direct injection valve 16 deprives the component of the thermal energy. As a result, the temperature of the component is reduced.

That is, the vertical movement of the temperature of the component due to the inflow and outflow of the thermal energy of the component may cause separation of the film on the component from the component.

Therefore, the controller 60 of the present embodiment calculates a correlation value of the amount of thermal energy transferred from the combustion gas flowing into the direct injection valve 16 from the cylinder 11 during one combustion cycle to the component of the direct injection valve 16. Based on the calculated value, the controller 60 calculates a damage index value, which is an index value of damage inflicted on the components of the direct injection valve 16 by the combustion gas flowing into the direct injection valve 16 from the inside of the cylinder #N during one combustion cycle of the cylinder #N. Then, the controller 60 estimates the degree of accumulation of damage of the component based on the damage index value.

Controller

Figure 7:
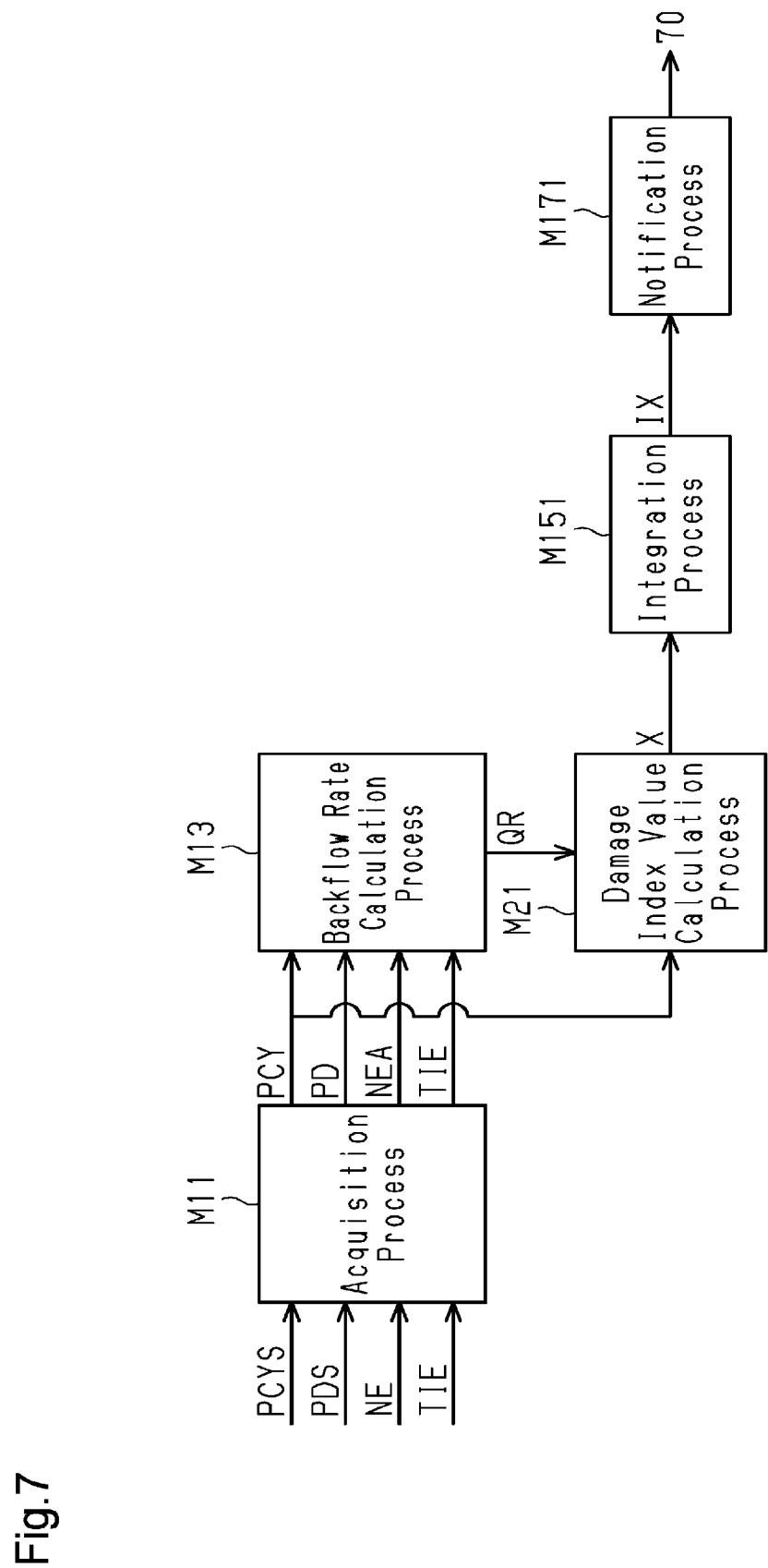
FIG. 7 is a block diagram illustrating processes executed by a controller for an internal combustion engine according to a third embodiment.

As illustrated in FIG. 7, the CPU 61 executes the control program to execute an acquisition process M11, a backflow rate calculation process M13, a damage index value calculation process M21, an integration process M151, and a notification process M171. The content of the acquisition process M11 and the content of the backflow rate calculation process M13 are similar to those of the first embodiment. Therefore, the description of the acquisition process M11 and the backflow rate calculation process M13 will be omitted here.

Damage Index Value Calculation Processing

In the damage index value calculation process M21, the CPU 61 calculates a damage index value X for each cylinder 11. That is, the CPU 61 calculates the damage index value X(1) of the component of the direct injection valve 16 for the cylinder #1. The CPU 61 calculates a damage index value X(2) of a component of the direct injection valve 16 for the cylinder #2. The CPU 61 calculates a damage index value X(3) of a component of the direct injection valve 16 for the cylinder #3. The CPU 61 calculates a damage index value X(4) of a component of the direct injection valve 16 for the cylinder #4.

A specific method of calculating the damage index value X(N) will be described. When abnormal combustion as described above occurs during one combustion cycle of the cylinder #N, the damage on the components of the direct injection valve 16 has a magnitude corresponding to the product of the gas temperature, which is the temperature of the combustion gas flowing into the direct injection valve 16, and the backflow energy amount, which is the amount of energy correlated with the backflow rate. That is, the damage index value X(N) can be calculated by using the following relational expression (D2). In the relational expression (D2), TMP is an index of the gas temperature. The ENR is an index of the backflow energy amount. According to the relational expression (D2), the larger the index TMP of the gas temperature, the larger the damage index value X becomes. In addition, the larger the index ENR of the backflow energy amount, the larger the damage index value X becomes.

$$X = TMP \times ENR \tag{D2}$$

The index TMP of the gas temperature increases as the in-cylinder pressure PCY increases. Therefore, a value calculated using the following relational expression (D3) is employed as the index TMP. In the relational expression (D3), P0 is a reference pressure in the cylinder #N. For example, the reference pressure P0 is set to the maximum value of the pressure during one combustion cycle in the cylinder #N when no abnormal combustion occurs.

$$TMP = PCY/P0 \tag{D3}$$

The index ENR of the backflow energy amount increases as a value obtained by squaring the backflow rate QR(N) increases. Therefore, a value calculated using the following relational expression (D4) is employed as the index ENR. In the relational expression (D4), CSA is the cross-sectional area of the flow path of the combustion gas flowing into the direct injection valve 16 from the inside of the cylinder #N. For example, the passage cross-sectional area of the internal fuel passage 47 of the direct injection valve 16 is used as the cross-sectional area CSA of the flow path of the combustion gas flowing into the direct injection valve 16.

$$ENR = QR^2/CSA^2 \tag{D4}$$

The relational expression (D2) can be transformed into the following relational expression (D5) by using the two relational expressions (D3) and (D4). KA in the relational expression (D5) is a constant that can be expressed by the following relational expression (D6).

$$X = PCY \times (QR^2)/KA \tag{D5}$$

$$KA = P0 \times (CSA^2) \tag{D6}$$

In the damage index value calculation process M21, the CPU 61 calculates the damage index value X(N) using the relational expression (D5). When calculating the damage index value X(N) of the component of the direct injection valve 16 for the cylinder #N, the CPU 61 calculates the damage index value X(N) by substituting the in-cylinder pressure PCY(N) and the backflow rate QR(N) into the relational expression (D5). As a result, the CPU 61 calculates the damage index value X(N) such that the larger the product of the value obtained by squaring the backflow rate QR(N) and the in-cylinder pressure PCY, the larger the damage index value becomes.

Integration Process

In the integration process M151, the CPU 61 integrates the damage index value X calculated in the damage index value calculation process M21 for each cylinder 11. That is, the CPU 61 calculates a damage index integrated value IX(1) by integrating the damage index value X(1) of the components of the direct injection valve 16 for the cylinder #1. The CPU 61 calculates the damage index integrated value IX(2) by integrating the damage index value X(2) of the components of the direct injection valve 16 for the cylinder #2. The CPU 61 calculates the damage index integrated value IX(3) by integrating the damage index value X(3) of the components of the direct injection valve 16 for the cylinder #3. The CPU 61 calculates the damage index integrated value IX(4) by integrating the damage index value X(4) of the components of the direct injection valve 16 for the cylinder #4.

Figure 8:
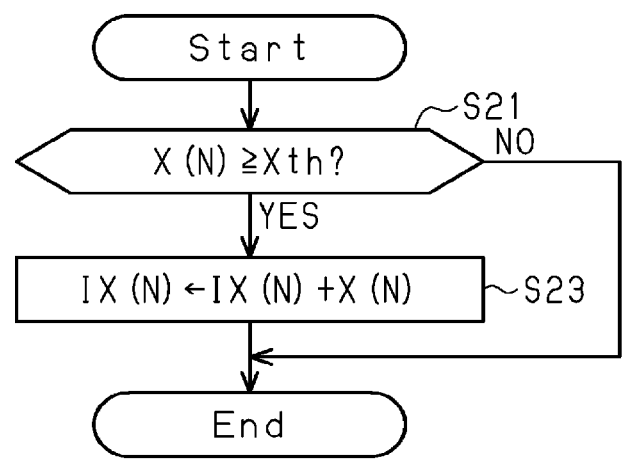
FIG. 8 is a flowchart illustrating an integration process executed by the controller according to the third embodiment.

FIG. 8 is a flowchart illustrating specific processing contents of the integration process M151.

In step S21, the CPU 61 determines whether the damage index value X(N) calculated in the damage index value calculation process M21 is greater than or equal to a threshold Xth.

Even if the combustion gas in the cylinder #N flows into the direct injection valve 16, the temperature of the components of the direct injection valve 16 does not rise so much when the damage index value X is small. Therefore, since the vertical movement width of the temperature of the component is not so large, the component is hardly damaged. Therefore, a threshold QRth is used as a criterion for determining whether the damage suffered by the component can be ignored. When the damage index value X(N) is less than the threshold Xth, it is considered that the component is not damaged due to the inflow of the combustion gas into the direct injection valve 16. On the other hand, when the damage index value X(N) is greater than or equal to the threshold Xth, it is considered that the component is damaged due to the inflow of the combustion gas into the direct injection valve 16.

In step S21, when the damage index value X(N) is greater than or equal to the threshold Xth(YES), the CPU 61 advances the process to step S23. On the other hand, when the damage index value X(N) is less than the threshold Xth (S21: NO), the CPU 61 temporarily ends the integration process M151. That is, the CPU 61 does not integrate the damage index value X(N) less than the threshold Xth.

In step S23, the CPU 61 calculates the sum of the damage index integrated value IX(N) and the damage index value X(N) as the latest value of the damage index integrated value IX(N). That is, the CPU 61 calculates the damage index integrated value IX(N) by integrating only the damage index value X(N) greater than or equal to the threshold Xth among the multiple damage index values X(N) calculated in the damage index value calculation process M21. Thereafter, the CPU 61 temporarily ends the integration process M151.

Notification Process

In the notification process M171, when the damage index integrated value IX(N) calculated in the integration process M151 is greater than or equal to a determination value IXth, the CPU 61 notifies the occupant of the vehicle. Specifically, when any one of the damage index integrated values IX(1), IX(2), IX(3), and IX(4) is greater than or equal to the determination value IXth, the CPU 61 notifies the occupant through the vehicle on-board warning device 70.

Operation and Advantages of Third Embodiment

In the third embodiment, in addition to the same advantages as the advantages (1-1) to (1-4) of the first embodiment, the following advantages are further obtained.

(3-1) The controller 60 calculates the damage index value X, which is a value corresponding to the amount of thermal energy transferred from the combustion gas flowing into the direct injection valve 16 to the component of the direct injection valve 16, based on the backflow rate QR. Then, the controller 60 calculates the damage index integrated value IX by integrating the damage index value X. The magnitude of the damage to the components caused by the combustion gas flowing into the direct injection valve 16 tends to increase as the amount of thermal energy increases. Therefore, by calculating the damage index integrated value IX, the degree of accumulation of the damage of the component is accurately estimated.

When the damage index integrated value IX(N) is greater than or equal to the determination value IXth, there is a possibility that an anomaly has occurred in the direct injection valve 16 for the cylinder #N. Therefore, when the damage index integrated value IX(N) becomes greater than or equal to the determination value IXth, the controller 60 notifies the occupant that there is a possibility that an anomaly has occurred in the internal combustion engine 10. As a result, it is possible to notify the occupant that it is time for maintenance of the internal combustion engine 10.

(3-2) Even if the combustion gas flows into the direct injection valve 16, the component is hardly damaged when the amount of thermal energy transferred to the component of the direct injection valve 16 at that time is small. Therefore, the controller 60 calculates the damage index integrated value IX(N) by integrating only the damage index value X(N) greater than or equal to the threshold Xth. As a result, the correlation between the degree of accumulation of damage of the components of the direct injection valve 16 and the damage index integrated value IX(N) is increased. This allows the controller 60 to notify the occupant that there is a possibility that an anomaly has occurred in the internal combustion engine 10 at a more appropriate timing.

Modifications

The above-described embodiments may be modified as follows. The above-described embodiments and the following modifications can be implemented in combination with each other within a range not technically contradictory.

In the above-described embodiments, the CPU 61 may acquire, as the in-cylinder pressure PCY(N), a value different from the maximum value of the in-cylinder pressure detection value PCYS detected during one combustion cycle of the cylinder #N as long as the value corresponding to the in-cylinder pressure detection value PCYS detected during one combustion cycle of the cylinder #N is acquired as the in-cylinder pressure PCY(N). For example, the CPU 61 may acquire the second largest in-cylinder pressure detection value PCYS among the in-cylinder pressure detection values PCYS detected during one combustion cycle of the cylinder #N as the in-cylinder pressure PCY(N). For example, the CPU 61 may acquire an average value of multiple in-cylinder pressure detection values PCYS detected during one combustion cycle of the cylinder #N as the in-cylinder pressure PCY(N). Further, for example, the CPU 61 may acquire an average value of multiple in-cylinder pressure detection values PCYS detected during the compression stroke of the cylinder #N as the in-cylinder pressure PCY(N).

In the above-described embodiments, the CPU 61 may acquire a value corresponding to the calculated value of the in-cylinder pressure based on the operating state of the internal combustion engine 10 as the in-cylinder pressure PCY(N).

In the above-described embodiments, the CPU 61 may acquire, as the supply fuel pressure PD(N), a value different from the average value of the supply fuel pressure detection values PDS detected in one combustion cycle of the cylinder #N as long as a value corresponding to the supply fuel pressure detection value PDS detected in one combustion cycle of the cylinder #N is acquired as the supply fuel pressure PD(N). For example, the CPU 61 may acquire any one of the supply fuel pressure detection values PDS detected during one combustion cycle of the cylinder #N as the supply fuel pressure PD(N). Specifically, the CPU 61 may acquire the maximum value of the supply fuel pressure detection values PDS detected during one combustion cycle of the cylinder #N as the supply fuel pressure PD(N).

In the above-described embodiments, the CPU 61 may acquire a value different from the average value of the engine rotation speeds NE detected in one combustion cycle of the cylinder #N as the engine rotation speed NEA(N) as long as the value corresponding to the engine rotation speed NE detected in one combustion cycle of the cylinder #N is acquired as the engine rotation speed NEA(N). For example, the CPU 61 may acquire any of engine rotation speeds NE detected during one combustion cycle of the cylinder #N as the engine rotation speed NEA(N). Specifically, the CPU 61 may acquire the maximum value of the engine rotation speeds NE detected during one combustion cycle of the cylinder #N as the engine rotation speed NEA(N).

In the above-described embodiments, the CPU 61 may calculate the backflow rate QR without considering the ending time TIE of the fuel injection of the direct injection valve 16.

In the above-described embodiments, the CPU 61 may calculate the backflow rate QR without considering the engine rotation speed NEA.

In the above-described embodiments, when the internal combustion engine 10 includes a knock sensor, the CPU 61 may determine whether abnormal combustion has occurred in the cylinder #N based on a detection value of the knock sensor in one combustion cycle of the cylinder #N.

In the third embodiment, the CPU 61 may calculate the damage index integrated value IX by also integrating the damage index value X less than the threshold Xth in the integration process M151. In this case, in the integration process M151 illustrated in FIG. 8, the determination in step S21 can be omitted.

In the first embodiment and the second embodiment, the CPU 61 does not need to cause the warning device 70 to notify the occupant even if the backflow rate integrated value IQR becomes greater than or equal to the determination value IQRth. In this case, the CPU 61 may notify a vehicle vendor or a maintenance factory of the necessity of maintenance of the internal combustion engine 10 via the external network.

In the third embodiment, the CPU 61 does not necessarily need to cause the warning device 70 to notify the occupant even if the damage index integrated value IX becomes greater than or equal to the determination value IXth. In this case, the CPU 61 may notify a vehicle vendor or a maintenance factory of the necessity of maintenance of the internal combustion engine 10 via the external network.

In the first embodiment and the second embodiment, the CPU 61 notifies the occupant through the vehicle on-board warning device 70 when any one of the backflow rate integrated values IQR(1), IQR(2), IQR(3), and IQR(4) is greater than or equal to the determination value IQRth, but the present invention is not limited thereto. For example, when the backflow rate integrated value IQR (1) becomes greater than or equal to the determination value IQRth, the CPU 61 may notify the occupant that it is better to replace or repair the direct injection valve 16 for the cylinder #1.

In the third embodiment, when any one of the damage index integrated values IX(1), IX(2), IX(3), and IX(4) is greater than or equal to the determination value IXth, the CPU 61 notifies the occupant through the vehicle on-board warning device 70, but the present invention is not limited thereto. For example, when the damage index integrated value IX(1) becomes greater than or equal to the determination value IXth, the CPU 61 may notify the occupant that it is better to replace or repair the direct injection valve 16 for the cylinder #1.

In a above-described embodiments, the number of cylinders of the internal combustion engine to which the controller 60 is applied may be any number other than four. For example, the controller 60 may be applied to an internal combustion engine having one cylinder, the controller 60 may be applied to an internal combustion engine having three cylinders, or the controller 60 may be applied to an internal combustion engine having six cylinders.

In the above-described embodiments, the internal combustion engine to which the controller 60 is applied does not necessarily need to be an internal combustion engine using hydrogen gas as fuel as long as the internal combustion engine includes the direct injection valve 16 that injects gaseous fuel into the cylinder 11. For example, the internal combustion engine to which the controller 60 is applied may e an internal combustion engine including a direct injection valve that injects compressed natural gas into the cylinder 11.

In the above-described embodiments, the pressure adjusting device included in the fuel supply device does not necessarily need to be a valve that decompresses the fuel by control. That is, the pressure adjusting device may include a mechanical valve.

In the above-described embodiments, the fuel supply device may include a tank that stores liquid hydrogen. In this case, when the fuel supply device is provided with a conversion device capable of converting liquid hydrogen into hydrogen gas on a fuel supply path from the tank to the direct injection valve 16, the direct injection valve 16 injects the hydrogen gas.

The controller 60 is not limited to a device that includes a CPU and a ROM and executes software processing. That is, the controller 60 may be modified if it has any one of the following configurations (a) to (c).

(a) The controller 60 includes one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) The controller 60 includes one or more dedicated hardware circuits that execute various processes. The dedicated hardware circuits include, for example, an application specific integrated circuit (ASIC) and a field programmable gate array (FPGA).

(c) The controller 60 includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine including a cylinder and a direct injection valve that injects gaseous fuel into the cylinder, the controller being processing circuitry that controls an operation of the internal combustion engine, wherein
    the processing circuitry is configured to
        acquire an in-cylinder pressure that is a pressure in the cylinder during one combustion cycle of the cylinder and a supply fuel pressure that is a pressure of the gaseous fuel supplied to the direct injection valve,
        calculate a backflow rate, which is an amount of combustion gas flowing into the direct injection valve from the cylinder during one combustion cycle of the cylinder; and
        in the calculation of the backflow rate, calculate the backflow rate such that the backflow rate becomes larger as the in-cylinder pressure increases, and the backflow rate becomes larger as the supply fuel pressure decreases.

2. The controller for the internal combustion engine according to claim 1, wherein the processing circuitry is configured to, in the acquisition of the in-cylinder pressure, acquire a maximum value of a pressure in the cylinder during one combustion cycle of the cylinder as the in-cylinder pressure.

3. The controller for the internal combustion engine according to claim 1, wherein the processing circuitry is configured to, in the calculation of the backflow rate, calculate the backflow rate such that the backflow rate becomes larger as a rotation speed of the internal combustion engine decreases.

4. The controller for the internal combustion engine according to claim 1, wherein the processing circuitry is configured to, in the calculation of the backflow rate, calculate the backflow rate such that the backflow rate becomes larger as an ending time of injection of the gaseous fuel in the direct injection valve is later.

5. The controller for the internal combustion engine according to claim 1, wherein
    the internal combustion engine is mounted on a vehicle, and
    the processing circuitry is configured to
        integrate the calculated backflow rates, and
        notify an occupant of the vehicle when an integrated value of the backflow rates is greater than or equal to a determination value.

6. The controller for the internal combustion engine according to claim 1, wherein
    the internal combustion engine is mounted on a vehicle, and
    the processing circuitry is configured to
        calculate a damage index value that is an index value of damage suffered by the direct injection valve when combustion gas in the cylinder flows into the direct injection valve during one combustion cycle of the cylinder, integrate the calculated damage index values, notify an occupant of the vehicle when an integrated value of the calculated damage index values is greater than or equal to a determination value, and calculate the damage index value, in the calculation of the damage index value, such that the damage index value becomes larger as a product of the in-cylinder pressure and a value obtained by squaring the backflow rate increases.

7. The controller for the internal combustion engine according to claim 6, wherein the processing circuitry is configured to, in the integration of the damage index values, integrate only the damage index values greater than or equal to a threshold among the calculated damage index values.

8. A control method for an internal combustion engine, the internal combustion engine including a cylinder and a direct injection valve that injects gaseous fuel into the cylinder, the control method comprising:

acquiring an in-cylinder pressure that is a pressure in the cylinder during one combustion cycle of the cylinder and a supply fuel pressure that is a pressure of gaseous fuel supplied to the direct injection valve; and calculating a backflow rate that is an amount of combustion gas flowing into the direct injection valve from the cylinder during one combustion cycle of the cylinder, the backflow rate being calculated such that the backflow rate becomes larger as the in-cylinder pressure increases, and the backflow rate becomes larger as the supply fuel pressure decreases.

\* \* \* \* \*